June 4, 1935.    R. R. SEARLES    2,003,906
BEARING AND METHOD OF FORMING SAME
Filed Dec. 4, 1930
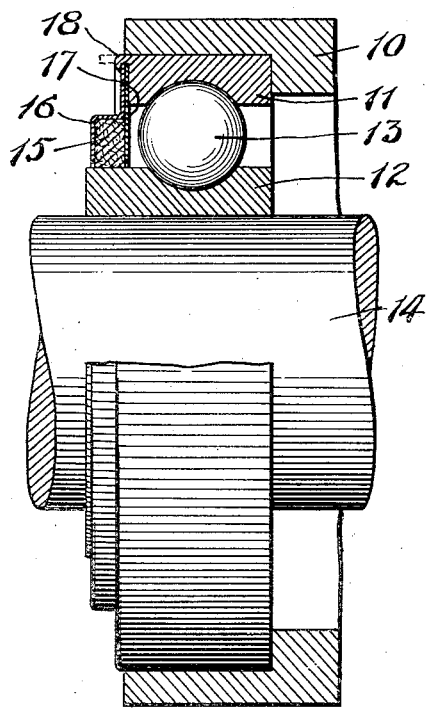
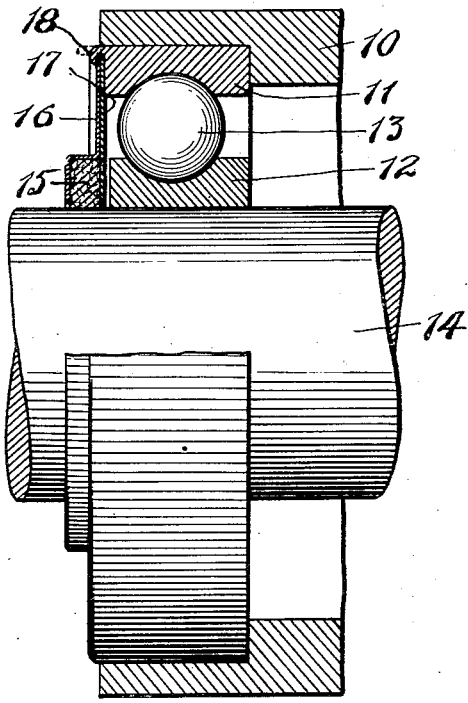
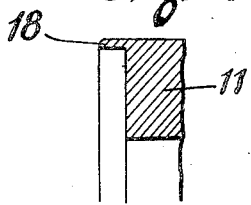
INVENTOR
Raymond R. Searles
BY
Mitchell & Bechtel
ATTORNEYS Patented June 4, 1935

2,003,906

UNITED STATES PATENT OFFICE 2,003,906

BEARING AND METHOD OF FORMING SAME

Raymond R. Searles, New Britain, Conn., assignor to The Fafnir Bearing Company, New Britain, Conn., a corporation of Connecticut Application December 4, 1930, Serial No. 499,927

6 Claims. (Cl. 29—148.4)

My invention relates to a bearing and more particularly to a bearing seal.

Heretofore, it has been common practice to provide various types of seals, whether such seals completely sealed the bearing or only acted as a sort of shield against the entry of foreign matter. Such so-called seals have been held in place by various means such as by attaching the same with screws, springing seal devices of resilient metal into grooves, and the like.

It is the principal object of my invention to provide an improved means of holding a seal in place and to improve the method of manufacture.

Other objects will be hereinafter pointed out, or will become apparent upon a reading of the descriptive portion of this specification.

Briefly stated, in a preferred form of the invention I form a bearing ring with a deformable portion such as a flange, and then put the seal in place and bend the deformable portion over so as to hold the seal to the ring. The seal itself may be of any conventional or desired form.

In the drawing which shows, for illustrative purposes only, preferred forms of the invention—

Fig. 1 is a view in elevation, partly broken away and illustrating features of the invention;

Fig. 2 is a view similar to Fig. 1, but illustrating a slightly different seal arrangement;

Fig. 3 is a fragmentary view illustrating a part of a ring before a seal has been secured thereto.

In said drawing 10 indicates conventionally or illustratively a mounting for an anti-friction bearing member. The particular anti-friction bearing disclosed is of the unit handling type, and includes an outer bearing ring 11 and an inner bearing ring 12, with interposed anti-friction bearing elements, such as balls 13. The outer ring is positioned in the mounting 10, while a shaft 4 extends through the bearing of the inner ring 12.

Any suitable type of sealing means, whether the same act as a complete seal or merely as a sort of shield, may be employed. I have illustrated a preferred sealing means, which includes a sealing ring 15 of suitable material, such as felt, which may be held between sheet metal or other disk-like members 16—17. One of the members (in this case the member 16) is provided with an offset portion forming a pocket for holding the ring 15, while the disk-like member 17 acts merely as a cover. One of the rings, in the present instance the outer ring 11, is provided at one side and preferably adjacent the outer circumferential surface thereof with a relatively thin, deformable portion, which may be in the form of a relatively thin fin-like flange extending completely around the ring.

In assembling the seal with the ring 11, the seal is set in place preferably against the edge face of the ring 11 and adjacent the deformable portion, after which the deformable part, whether in the form of a flange or otherwise, is bent down or otherwise deformed so as to hold the seal in place, for example as illustrated in Figs. 1 and 2. The seal carried by one ring may engage or extend into proximity to the circumferential surface of the other ring, for example as shown in Fig. 1, or the seal may extend along the edge faces of the inner ring 12 and may engage or extend in proximity to the shaft 14. In Fig. 1 the inner ring projects at one side beyond the adjacent edge of the outer ring.

In making my improved seal, the ring to carry the seal, such as the outer ring, is first formed in the usual manner and by suitable means, such as a lathe operation, the flange 18, which is preferably rather thin, is left projecting at one edge. The bearing ring is then tempered so as to produce the desired degree of hardness and wear resistance usual in anti-friction bearings. This hardening, generally speaking, is imparted also to the flange 18. After the outer ring is then completed, as by grinding, it may be treated so as to render the portion 18 deformable. This is best accomplished by quickly heating the portion 18, as by setting the same upon a hot plate or by any other means, and, due to the relative thinness of the portion 18, the temper is drawn therefrom without drawing the temper of any substantial portion of the main outer ring 18. Thus, the ring 11 is hard and wear resisting, as is required in an anti-friction bearing, while the part 18 is relatively softer and deformable.

By means of my invention the sealing means, whether resilient, deformable, or very hard, may be securely held in place without any deformation or treatment of any kind. There are no attaching means to work loose and the seal will not spring out.

While the invention has been described in considerable detail and preferred embodiments illustrated, I, of course, do not wish to be limited to the embodiments shown, for various changes may be made within the scope of the invention as defined in the appended claims.

I claim:

1. A metallic bearing ring for an anti-friction bearing, having at one end a relatively thin integral flange extending therefrom, the main body of the ring being hard and the flange being soft and bendable.

2. In a ball bearing, two bearing rings of hard metal, a flange at the end of one of said rings integral therewith and being softer than the body of the ring and bendable, balls between the hard portions of said rings, and a seal member seated on the end of the ring having the flange and overstanding the space between said rings at one end thereof, said flange being bent over said seal to hold it in place.

3. In the method of forming an anti-friction bearing, the step which includes first forming a ring of metal with a thin integral flange projecting from one end thereof, then hardening said ring and flange, and then subjecting said ring and flange to sufficient heat to soften the flange only and render the same readily deformable, while said ring remains hard.

4. In the method of forming an anti-friction bearing, the step which includes first forming a metal ring with a relatively thin integral projecting portion at one end thereof, then hardening said ring and projecting portion, and then heating the projecting portion sufficiently only to draw the temper thereof and render the same readily deformable, while leaving said ring hard.

5. The method of applying a bearing seal to a bearing ring, which comprises first forming a bearing ring with a relatively thin portion at one end, then hardening said ring and thin portion, then softening said thin portion to render it bendable while leaving said ring hard, then positioning a seal member adjacent to said thin portion, and finally bending said thin portion over said seal member to hold it against the end of said ring.

6. The method of forming an anti-friction bearing member, which includes forming a metal race ring with integral relatively thin flange-like means, then hardening said race ring and flange-like means, and thereafter heating said flange-like means to soften the same while leaving said ring hard and deforming the flange-like means to hold a seal member.

RAYMOND R. SEARLES.